United States Patent
Wroblewski et al.

(10) Patent No.: US 9,037,891 B2
(45) Date of Patent: May 19, 2015

(54) MULTI-PROCESSOR SYNCHRONIZATION USING TIME BASE COUNTERS

(71) Applicant: Hamilton Sundstrand Corporation, Windsor Locks, CT (US)

(72) Inventors: Marcin Wroblewski, Unionville, CT (US); Christopher Noll, Glastonbury, CT (US)

(73) Assignee: Hamilton Sundstrand Corporation, Windsor Locks, CT (US)

(*) Notice: Subject to any disclaimer, the term of this patent is extended or adjusted under 35 U.S.C. 154(b) by 324 days.

(21) Appl. No.: 13/780,965

(22) Filed: Feb. 28, 2013

(65) Prior Publication Data
US 2014/0245057 A1 Aug. 28, 2014

(51) Int. Cl.
*G06F 1/04* (2006.01)
*G06F 1/12* (2006.01)
*G06F 11/16* (2006.01)
*G06F 1/10* (2006.01)
*G06F 1/08* (2006.01)

(52) U.S. Cl.
CPC ... *G06F 1/12* (2013.01); *G06F 1/10* (2013.01); *G06F 1/08* (2013.01); *G06F 11/1679* (2013.01)

(58) Field of Classification Search
CPC ............... G05F 1/12; G06F 1/10; G06F 1/08
USPC ........................................... 713/375, 400, 500
See application file for complete search history.

(56) References Cited

U.S. PATENT DOCUMENTS

| | | | |
|---|---|---|---|
| 5,239,641 A * | 8/1993 | Horst | 713/375 |
| 7,770,049 B1 | 8/2010 | Searles et al. | |
| 2008/0109674 A1* | 5/2008 | Levine et al. | 713/503 |
| 2010/0275053 A1 | 10/2010 | Salam et al. | |
| 2012/0204055 A1* | 8/2012 | Paul et al. | 713/401 |
| 2014/0118000 A1* | 5/2014 | Pan et al. | 324/537 |

OTHER PUBLICATIONS

European Search Report dated Jun. 13, 2014 for EP 14156541.

* cited by examiner

*Primary Examiner* — Jaweed A Abbaszadeh
*Assistant Examiner* — Phil Nguyen
(74) *Attorney, Agent, or Firm* — Kinney & Lange, P.A.

(57) ABSTRACT

A multi-processor system includes a first processor that includes a first time base counter that outputs a first time base count, a second processor that includes a second time base counter that outputs a second time base count, and a communication bus. The first and second processors exchange the first and second time base counts on the communication bus. The first and second processors determine a skew based upon a difference between the first and second time base counts, and the first and second processors synchronize with each other based upon the skew.

11 Claims, 3 Drawing Sheets

MULTI-PROCESSOR SYNCHRONIZATION USING TIME BASE COUNTERS

BACKGROUND

Critical systems, such as those onboard an aircraft, often include multiple processors, which may be used for redundancy. Each processor may execute the same instructions, and monitor the same data. These systems often run in frames, looping over a given time period. For example, multiple processors may be set up in parallel to continuously monitor and analyze flight critical sensor data. Each processor individually monitors and analyzes the same data and compares its results with the other processors. This way, if a fault occurs with one of the processors, it can be detected and is not detrimental to the system.

When operating in a multi-processor environment, variation in each processor's execution may create a time skew between the processors. When the processors are executing the same code, one processor may lag behind the others due to, for example, taking a different path through the code, delays due to data fetches, or any other reason a processor may be executing instructions at a slower rate. Skews are undesirable in that they may lead to each processor measuring and analyzing different data, creating inconsistencies between the processors. It is desirable to occasionally synchronize the processors to ensure that, over time, the processors are executing instructions and monitoring data at the same rate.

SUMMARY

A multi-processor system includes first and second processors, and a communication bus. The first processor includes a first time base counter that outputs a first time base count. The second processor includes a second time base counter that outputs a second time base count. The first and second processors exchange the first and second time base counts on the communication bus. The first and second processors determine a skew based upon a difference between the first and second time base counts, and the first and second processors synchronize with each other based upon the skew.

DETAILED DESCRIPTION

The present invention is related to multi-processor systems, and in particular to a system and method for synchronizing multiple processors using time base counters. Each processor is run off of the same oscillator crystal, and includes a time base counter which counts at a given frequency. Prior to normal operation, each processor shares a count of its time base counter with all other processors. An initial difference between the time base counts is determined and stored by each processor. At a specified point in operation such as, for example, at the deterministic start of an execution frame, the processors once again exchange counts of their time base counters. Each processor determines a present difference between the counts and compares it to the stored initial difference. If the initial difference and the present difference are not equal, then a skew has been detected. The processors then adjust their execution, or the length of their execution frame, in order to eliminate the skew. This process is repeated periodically throughout execution in order to ensure the processors remain synchronized over extended periods of time.

Figure 1A:
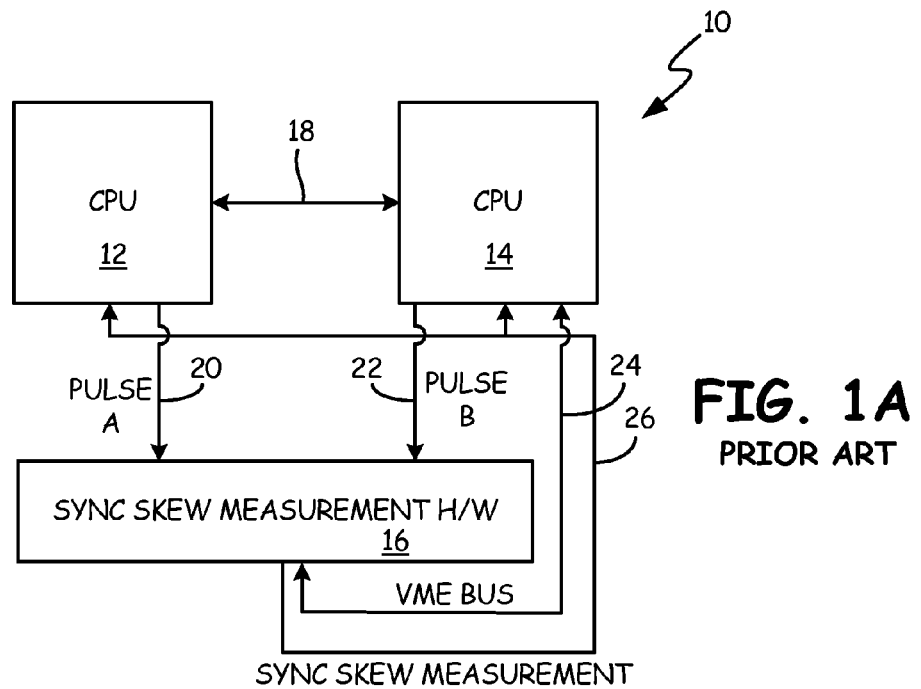
FIG. 1A is a block diagram illustrating a system for synchronizing multi-processor systems according to the prior art.

FIG. 1A is a block diagram illustrating a system 10 for synchronizing multi-processor systems according to the prior art. System 10 includes processors 12 and 14, and synchronization hardware 16. Processors 12 and 14 communicate with one another using a communication bus 18 such as, for example, a peripheral component interconnect (PCI) bus. Each processor 12 and 14 may provide a pulse to synchronization hardware 16 on output lines 20 and 22, respectively. Synchronization hardware may communicate with processor 14 over communication bus 24 which may be implemented as, for example, a Versa Module Eurocard (VME) bus. Synchronization information is communicated to each processor 12 and 14 over communication path 26, which may be implemented by first communicating the information to processor 14 over communication bus 24, and then to processor 12 from processor 14 over communication bus 18. Processors 12 and 14 are any microprocessors capable of executing instructions. Synchronization hardware 16 is any digital logic capable of handling data and calculating a time skew such as, for example, a field programmable gate array (FPGA), application specific integrated circuit (ASIC), or any other digital logic circuit.

Figure 1B:
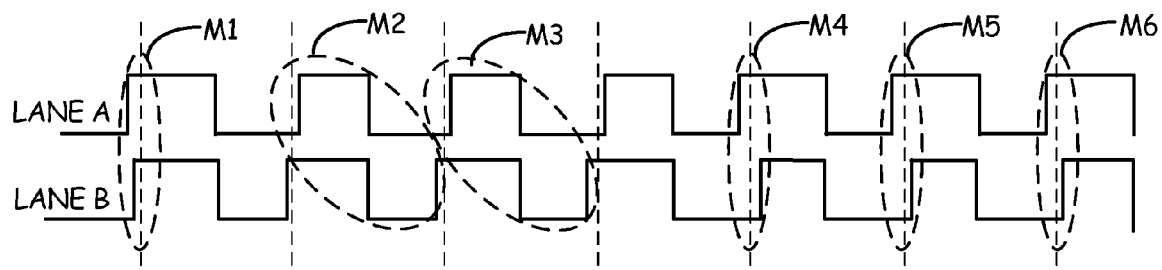
FIG. 1B is a chart illustrating pulses used to synchronize multi-processor systems according to the prior art.

FIG. 1B is a chart illustrating pulses used to synchronize multi-processor systems according to the prior art. Lane A and lane B represent the data on output lines 20 and 22 of FIG. 1A, respectively. The pulses on lanes A and B are generated by respective processors 12 and 14 of FIG. 1A at predetermined periodic rates. For example, if the code on both processors 12 and 14 is repeatedly executed in frames, after each frame, processors 12 and 14 may provide a pulse on respective outputs 20 and 22. Because each processor is executing the same code, if no skew is present between processors 12 and 14, the pulses should occur at the same time. Synchronization hardware 16 may monitor, for example, the rising edge of each pulse to determine if a skew is present.

Skew represents the differing times it takes each processor 12 and 14 to execute the given frame. Skew may occur for various reasons such as, for example, varying data access times between processors, or different paths taken through the code by each processor. This skew may be sent to processors 12 and 14 over communication path 26. Processors 12 and 14 synchronize by compensating for the skew detected by synchronization hardware 16. This may be accomplished, for example, by extending the next execution frame of the processor that is leading. This extension is by an amount equal to the skew. In another embodiment, synchronization may be accomplished by decreasing the time of the next execution frame of the processor that is lagging behind. This decrease is by an amount equal to the skew.

Various limitations arise from the implementation in FIGS. 1A and 1B. For example, synchronization hardware 16 may begin skew measurement with a rising edge of a pulse on lane A. Measurements M1-M6 represent time skew measurements for this case. When the pulse on lane A begins prior to the pulse on lane B, as shown for measurements M1 and M4-M6, the measurement represents the skew between processors 12 and 14. However, if the rising edge of the pulse on lane B is prior to the rising edge of the pulse on lane A, then the measurements, such as those at M2 and M3 will not represent the skew between processors, but will rather represent a time much greater than the actual skew.

Figure 2A:
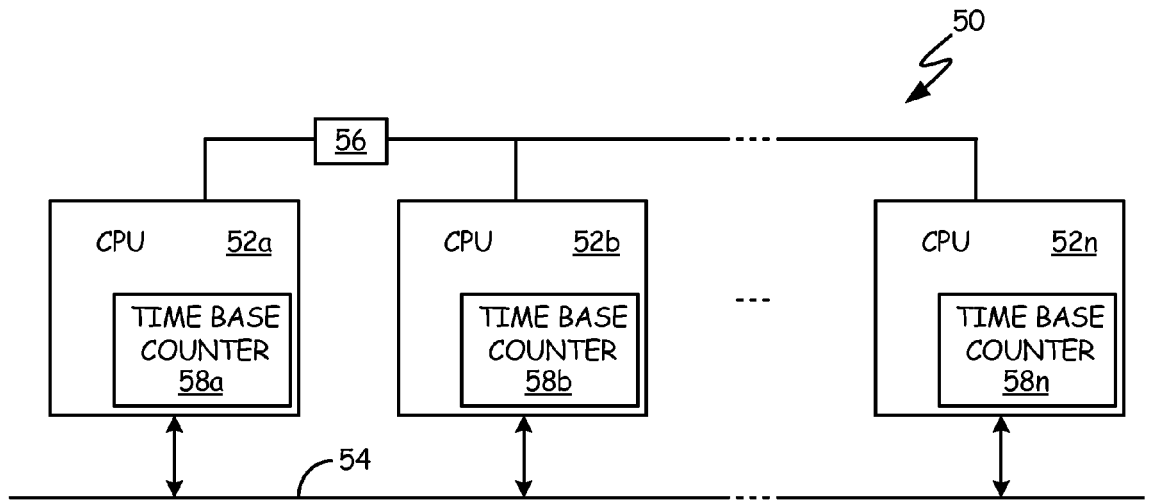
FIG. 2A is a block diagram illustrating a system for synchronizing multi-processor systems using time base counters.

FIG. 2A is a block diagram illustrating a system 50 for synchronizing multi-processor systems using time base counters. System 50 includes processors 52a-52n, communication bus 54, and oscillator crystal 56. Each processor 52a-52n includes a respective time base counter 58a-58n. Time base counters 58a-58n are digital logic circuits that keep a count based upon the clock of the respective processor 52a-52n. The clock of each processor 52a-52n may be run off of shared oscillator crystal 56 which ensures that each time base counter 58a-58n counts at the same rate. Processors 52a-52n communicate with each other over communication bus 54 which may be implemented as, for example, a peripheral component interconnect (PCI) bus. System 50 may contain any number of processors 52a-52n greater than, or equal to two.

Processors 52a-52n exchange time base counts over communication bus 54 to facilitate synchronization. When each processor 52a-52n initializes and begins executing instructions, its respective time base counter 58a-58n begins counting. Time base counters 58a-58n all count at the same rate. This rate may be any desired rate attainable based upon shared oscillator crystal 56. Because initialization may not occur identically between processors 52a-52n, respective time base counters 58a-58n may be at different counts when they begin executing instructions. Because of this, during initialization, each processor 52a-52n sends its respective time base counts to all other processors. Each processor 52a-52n calculates and stores an initial difference between its time base count and the time base counts of each of the other processors.

Processors 52a-52n exchange time base counts at predetermined times during execution. These predetermined times may be implemented in, for example, hardware or software. If implemented in software, the software may instruct each processor 52a-52n to send its respective time base counts to each other processor. Because processors 52a-52n are executing the same software, they will each share their respective time base counts at the same point in execution. Each processor 52a-52n calculates a present difference between its present time base count, and the present time base count of each of the other processors 52a-52n, once it has received new time base counts from each processor 52a-52n. Therefore, each processor 52a-52n knows an initial time base count difference and a present time base count difference for each other processor. Each processor 52a-52n compares the present time base count difference with the initial time base count difference. If the initial difference and the present difference are not equal, then there is a skew. In another embodiment, the predetermined times may be implemented in hardware using, for example, hardware interrupts. A hardware interrupt may trigger sharing of time based counts between processors 52a-52d, for example, once every execution frame. These interrupts may be generated using any hardware such as, for example, an application specific integrated circuit (ASIC).

If a skew is detected, each processor 52a-52n adjusts its execution time in order to synchronize with the other processors. Based upon the determined skews, each processor can determine if it is leading any other processor in execution. If it is, then it adjusts its next execution frame, for example, by the amount time representative of the greatest skew between itself and any of the other processors. This may be accomplished using software, hardware, or any other known method. If implemented in software, for example, the processor may execute wait instructions to extend its execution frame by the desired amount. This desired amount is the value that will make the difference between present time base counts equal to the difference in initial time base counts of each processor 52a-52n. The system in FIG. 2A may be used as a primary, standalone synchronization system, or as a redundant synchronization system along with, for example, the system in FIG. 1A.

Figure 2B:
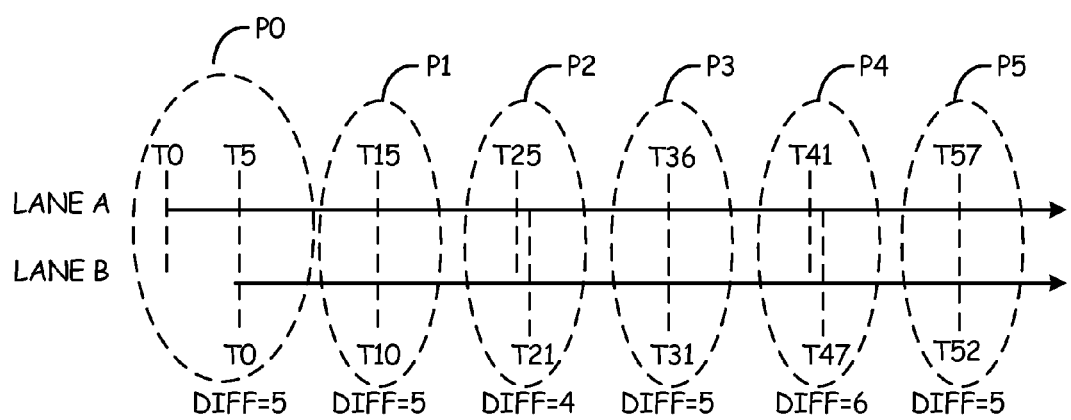
FIG. 2B is a chart illustrating time base counts used for synchronization of multi-processor systems.

FIG. 2B is a chart illustrating time base counts used for synchronization of multi-processor systems. Lane A represents a timeline for time base counter 58a of processor 52a, and lane B represents a timeline for time base counter 58b of processor 52b. While only two timelines are shown for processors 52a and 52b, the same principles apply for all other processors in system 50. Execution points P0-P5 represent shared points in execution of processors 52a and 52b for which they exchange time base counters. Processors 52a and 52b initially share their time base counts at execution point P0. The initial difference is determined to be five. At execution point P1, processors 52a and 52b again share their time base counts with one another. The difference remains five, so there is no skew present. At execution point P2, the difference is four, so the skew is one. Lane A is leading lane B, and thus, processor 52a extends its next execution frame by one to synchronize with processor 52b. At execution point P3, the difference is once again five, and thus, there is no skew. At execution point P4, the difference is six, and therefore, the skew is one. Lane B is leading lane A, so processor 52b extends its next execution frame by one to synchronize with processor 52a. At execution point P5, the difference is once again five, so there is no skew.

Figure 3:
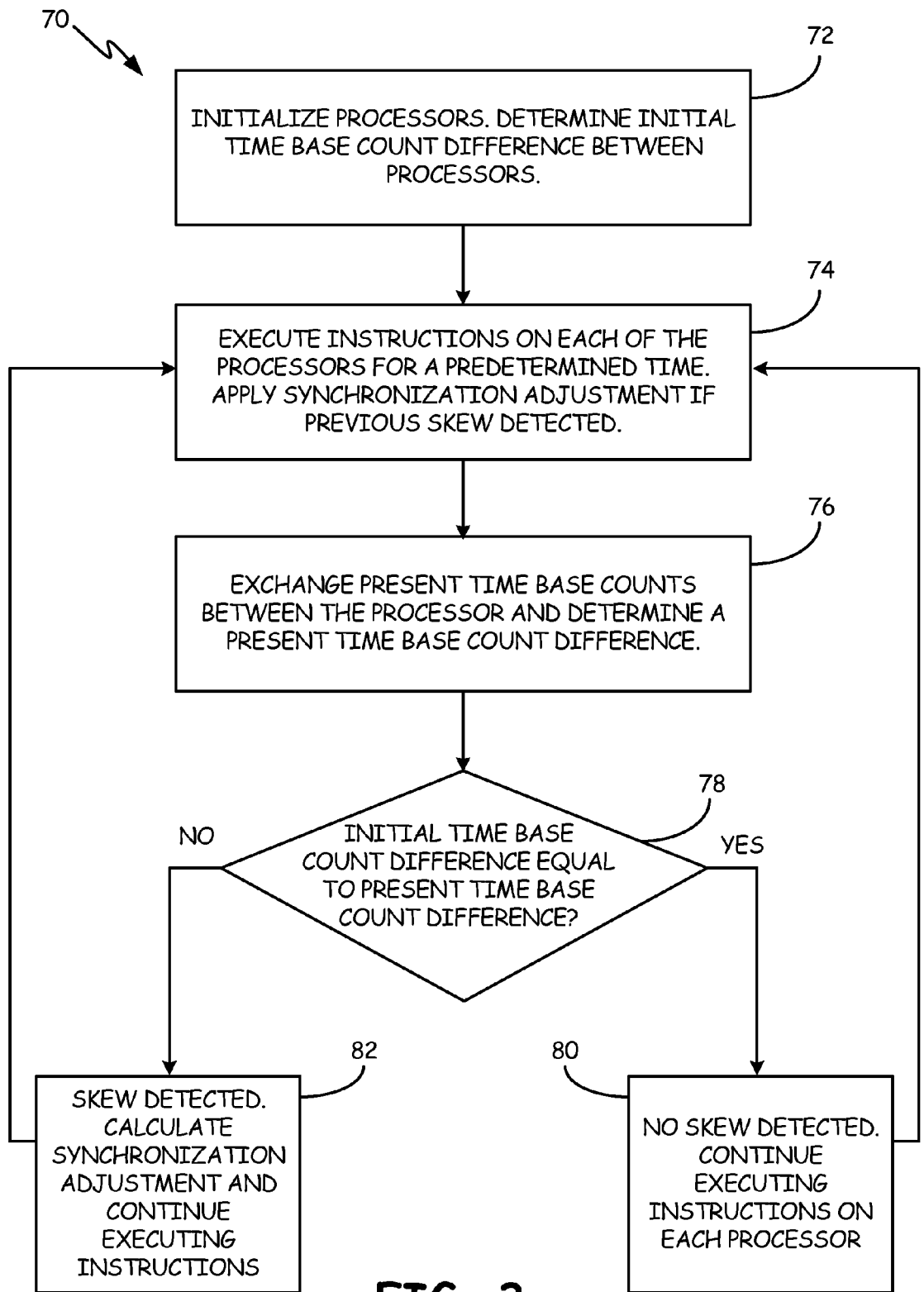
FIG. 3 is a flowchart illustrating a method for synching multi-processor systems using time base counters.

FIG. 3 is a flowchart illustrating method 70 for synching multi-processor systems using time base counters. At step 72, the system comes online, and each processor initializes. At this step, the time base counters begin counting. During initialization, each processor compares its time base count value with that of the other processors. Each processor stores an initial difference between its time base count and the time base counts of the other processors. At step 74, the processors are in normal operation, all executing the same code, for example, for an execution frame. If a previous skew has been detected for a processor, the processor applies a synchronization adjustment to its present execution by, for example, adjusting the length of its present execution frame. At step 76, the processors exchange their present time base counts. At step 78, it is determined if the present difference between time base counts is equal to the initial difference between time base counts. If they are equal, method 70 proceeds to step 80. If they are not equal, a skew has been detected, and method 70 proceeds to step 82. At step 80, because no skew has been detected, the processors continue executing instructions without calculating a synchronization adjustment and method 70 returns to step 74. At step 82, the processors each calculate a respective synchronization adjustment and continue executing instructions and method 70 returns to step 74. Method 70 continues for the duration of normal system operation.

The following are non-exclusive descriptions of possible embodiments of the present invention.

A multi-processor system includes, among other things: a first processor that includes a first time base counter that outputs a first time base count, a second processor that includes a second time base counter that outputs a second time base count, and a communication bus. The first and second processors exchange the first and second time base counts on the communication bus. The first and second processors determine a skew based upon a present difference between the first and second time base counts, and the first and second processors synchronize with each other based upon the skew.

The multi-processor system of the preceding paragraph can optionally include, additionally and/or alternatively, any one or more of the following features, configurations and/or additional components:

The communication bus is a peripheral component interconnect bus.

The first and second processors exchange the first and second time base counts after predetermined time period.

The first and second processors exchange the first and second time base counts during initialization to determine an initial difference between the first and second time base counts.

The skew is further based upon a difference between the present difference and the initial difference.

The first and second processors run off of a common oscillator crystal.

A synchronization hardware module that receives pulses from the first and second processors. The synchronization hardware also determines the skew based upon the pulses from the first and second processors.

A method for synching multiple processors includes, among other things: determining a difference between an initial first time base count and an initial second time base count, sending a present first time base count from a first processor to a second processor, sending a present second time base count from the second processor to the first processor, determining a skew base upon a difference between the present first time base count and the present second time base count, and the difference between the initial first time base count and the initial second time base count, synchronizing the first processor and the second processor base upon the skew.

The method of the preceding paragraph can optionally include, additionally and/or alternatively, any one or more of the following features, configurations and/or additional components:

The first time base count and the second time base count are sent on a communication bus.

The communication bus is a peripheral component interconnect bus.

Determining a difference between an initial first time base count and an initial second time base count includes sending the initial first time base count from the first processor to the second processor, sending the initial second time base count from the second processor to the first processor, determining the difference between the initial first time base count and the initial second time base count, and storing the difference between the initial first time base count and the initial second time base count using the first and second processors.

The first and second processors run off of a common oscillator crystal.

A microprocessor of a multiprocessor system includes, among other things: a time base counter that provides a local time base count, and an input that receives an external time base count. The microprocessor compares the local time base count with the external time base count during initialization to determine an initial count difference. The microprocessor compares the local time base count with the external time base count after a predetermined time to determine a present count difference, and the microprocessor compares the initial count difference and the present count difference to determine a skew.

The microprocessor of the preceding paragraph can optionally include, additionally and/or alternatively, any one or more of the following features, configurations and/or additional components:

The external time base count is received from a parallel microprocessor.

An output that provides the local time base count to the parallel microprocessor.

The input and the output are connected to a peripheral component interconnect bus.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A multi-processor system comprising:
    a first processor that includes a first time base counter that outputs a first time base count;
    a second processor that includes a second time base counter that outputs a second time base count;
    a communication bus, wherein the first and second processors exchange the first and second time base counts on the communication bus;
    wherein the first and second processors determine a skew based upon a present difference between the first and second time base counts; wherein the first and second processors synchronize with each other based upon the skew;
    wherein the first and second processors exchange the first and second time base counts during initialization to determine an initial difference between the first and second time base counts; and wherein the skew is further based upon a difference between the present difference and the initial difference.

2. The system of claim 1, wherein the communication bus is a peripheral component interconnect bus.

3. The system of claim 1, wherein the first and second processors exchange the first and second time base counts after a predetermined time period.

4. The system of claim 1, wherein the first and second processors run off of a common oscillator crystal.

5. The system of claim 1, further comprising a synchronization hardware module that receives pulses from the first and second processors, wherein the synchronization hardware also determines the skew based upon the pulses from the first and second processors.

6. A method for synching multiple processors, the method comprising:
    determining a difference between an initial first time base count and an initial second time base count;
    sending a present first time base count from a first processor to a second processor;
    sending a present second time base count from the second processor to the first processor;
    determining a skew base upon a difference between the present first time base count and the present second time base count, and the difference between the initial first time base count and the initial second time base count; and synchronizing the first processor and the second processor based upon the skew; wherein determining a difference between an initial first time base count and an initial second time base count comprises:

sending the initial first time base count from the first processor to the second processor; sending the initial second time base count from the second processor to the first processor;

determining the difference between the initial first time base count and the initial second time base count; and storing the difference between the initial first time base count and the initial second time base count using the first and second processors.

7. The method of claim 6, wherein the first time base count and the second time base count are sent on a communication bus.

8. The method of claim 6, wherein the communication bus is a peripheral component interconnect bus.

9. The method of claim 6, wherein the first and second processors run off of a common oscillator crystal.

10. A microprocessor of a multiprocessor system, the microprocessor comprising:

a time base counter that provides a local time base count;

an input that receives an external time base count;

an output that provides the local time base count to a parallel microprocessor;

wherein the microprocessor compares the local time base count with the external time base count during initialization to determine an initial count difference;

wherein the microprocessor compares the local time base count with the external time base count after a predetermined time to determine a present count difference;

wherein the microprocessor compares the initial count difference and the present count difference to determine a skew; and wherein the microprocessor and the parallel microprocessor synchronize with each other based upon the skew; and wherein the external time base count is received from the parallel microprocessor.

11. The microprocessor of claim 10, wherein the input and the output are connected to a peripheral component interconnect bus.

* * * * *